(12) United States Patent
Guo

(10) Patent No.: US 9,020,474 B2
(45) Date of Patent: Apr. 28, 2015

(54) SYSTEM AND METHOD FOR WIRELESS NETWORK MANAGEMENT

(75) Inventor: Xin Guo, Beijing (CN)

(73) Assignee: Sony Corporation, Tokyo (JP)

( * ) Notice: Subject to any disclaimer, the term of this patent is extended or adjusted under 35 U.S.C. 154(b) by 125 days.

(21) Appl. No.: 13/978,003

(22) PCT Filed: Dec. 2, 2011

(86) PCT No.: PCT/CN2011/083371
§ 371 (c)(1),
(2), (4) Date: Jul. 2, 2013

(87) PCT Pub. No.: WO2012/092802
PCT Pub. Date: Jul. 12, 2012

(65) Prior Publication Data
US 2013/0288735 A1    Oct. 31, 2013

(30) Foreign Application Priority Data

Jan. 7, 2011  (CN) .......................... 2011 1 0020149

(51) Int. Cl.
*H04W 48/14* (2009.01)
*H04W 24/02* (2009.01)
*H04W 24/00* (2009.01)
*H04W 4/00* (2009.01)
(Continued)

(52) U.S. Cl.
CPC .............. *H04W 24/02* (2013.01); *H04W 24/00* (2013.01); *H04W 48/08* (2013.01); *H04W 74/00* (2013.01); *H04W 4/001* (2013.01); *H04W 4/08* (2013.01)

(58) Field of Classification Search
CPC ..... H04W 48/14; H04W 84/18; H04W 12/06; H04W 84/12; H04W 4/00
USPC ................ 455/414.1, 420, 426.2, 428, 423.3; 709/204, 224, 250
See application file for complete search history.

(56) References Cited

U.S. PATENT DOCUMENTS 7,420,942 B2    9/2008  Wang
2005/0240680 A1*  10/2005  Costa-Requena et al. .... 709/250
(Continued)

FOREIGN PATENT DOCUMENTS

| CN | 1787455 | 6/2006 |
| CN | 101164289 | 4/2008 |
| CN | 101442459 | 5/2009 |

OTHER PUBLICATIONS

International Search Report Issued Mar. 8, 2012 in PCT/CN11/083371 Filed Dec. 2, 2011.

*Primary Examiner* — Minh D Dao
(74) *Attorney, Agent, or Firm* — Oblon, McClelland, Maier & Neustadt, L.L.P.

(57) ABSTRACT

A system and method for wireless network management, for managing wireless access technology and available resources of plural wireless networks. The wireless network management system includes: an information interaction module for collecting wireless network relevant information; a service discovery module for discovering service demands of the wireless networks to generate a set of service demand networks; and an analysis and decision module for determining a new wireless network configuration by merging networks and/or partitioning a network group, wherein the information interaction module is also used for distributing the new wireless network configuration to the wireless networks to allow these to carry out system reconfiguration. With the system and method, cooperative and competitive relationships between wireless networks can be adjusted to enable the networks to adapt to dynamic change of user distribution and resource demands thereof more flexibly and quickly, thereby achieving effective utilization of resources.

19 Claims, 6 Drawing Sheets

(51) Int. Cl.
*H04W 4/08* (2009.01)
*H04W 48/08* (2009.01)
*H04W 74/00* (2009.01)

(56) References Cited

U.S. PATENT DOCUMENTS

| | | | |
|---|---|---|---|
| 2005/0286478 A1* | 12/2005 | Mela et al. | 370/338 |
| 2006/0104219 A1* | 5/2006 | Kennedy | 370/254 |
| 2007/0033590 A1* | 2/2007 | Masuouka et al. | 718/100 |
| 2007/0104160 A1* | 5/2007 | Ho | 370/338 |
| 2008/0113652 A1* | 5/2008 | Liu | 455/414.1 |
| 2010/0115085 A1* | 5/2010 | Saffre et al. | 709/224 |
| 2011/0151840 A1* | 6/2011 | Gong et al. | 455/414.1 |
| 2012/0036252 A1* | 2/2012 | Shi et al. | 709/224 |
| 2014/0258395 A1* | 9/2014 | Tng | 709/204 |

* cited by examiner

SYSTEM AND METHOD FOR WIRELESS NETWORK MANAGEMENT

FIELD OF THE INVENTION

The present invention relates to the field of communication technology, and more particularly, to a wireless network management system and method for managing Radio Access Technologies (RATs) of a plurality of wireless networks and available resources thereof.

BACKGROUND OF THE INVENTION

With the rapid development of computer and communication technologies, the global information network is quickly evolving towards an IP-base NGN (Next Generation Network). Limited radio resources are becoming rarer while requests for wireless multi-media service from a user are increasingly growing. Therefore, the radio access technologies are continuously improved so as to make use of radio resources to the largest extent. As a result, a network structure of the access network becomes increasingly complex and there appear a variety of radio technologies co-existing in the same geographical region to produce a three dimensional coverage configuration. Meanwhile, user distribution and resource requests dynamically change every moment in the process of network operating. Under the above various conditions, how to sufficiently utilize radio resources to make the user get opportunities to acquire more resources while reducing mutual interference caused when using the radio resources to ensure service quality for the user has become a difficult problem to be solved in research of the wireless network technology.

Traditional solutions generally make use of resource scheduling methods such as bandwidth borrowing or multiplexing or the like to deal with dynamic variation in user distribution and resource requests thereof on the premise of not changing the network structure. This is mainly limited by a previous implementation manner in which the radio technology is fixed into hardware. Nowadays, a cognitive radio technology on a software radio basis is developing rapidly, which has characteristics being capable of perceiving surrounding radio environments and performing adaptive adjustment in accordance with the cognitive result, thereby greatly improving flexibility of network programming. As such, how to utilize such new characteristics to improve utilization of resources is a challenge in this technical field.

SUMMARY OF THE INVENTION

The brief summary of the invention will be given below to provide basic understanding of some aspects of the invention. However, it shall be appreciated that this summary is neither exhaustively descriptive of the invention nor intended to define essential or important components or the scope of the invention but is merely for the purpose of presenting some concepts of the invention in a simplified form and hereby acts as a preamble of more detailed descriptions which will be presented later.

In view of the above circumstances of the existing technology, an object of the invention is to provide a wireless network management system and method in which cooperative and competitive relationship among wireless networks is adjusted through management and configuration for the radio access technologies of the wireless networks and available resources thereof, so that the networks may be more flexibly and rapidly adapted to dynamic variations in the user distribution and resource requests thereof, thereby realizing effective utilization of the resources.

To achieve the above object, according to an aspect of the invention, there is provided a wireless network management system for managing radio access technologies and available resources of a plurality of wireless networks, each of the plurality of wireless networks having ability to reconfigure its radio access technology and radio resources, the wireless network management system including: an information interaction module configured to collect wireless network relevant information necessary for managing the wireless networks; a service discovery module configured to discover service requests of the wireless networks to generate a service request network set; and an analysis and decision module configured to determine, through network merge and/or network group split, a new wireless network configuration for the service request network set discovered by the service discovery module based on the wireless network relevant information, in which the information interaction module is further configured to issue the wireless network configuration determined by the analysis and decision module to the wireless networks so as to cause the wireless networks to perform system reconfiguration.

According to another aspect of the invention, there is further provided a wireless network management method for managing radio access technologies and radio resources of a plurality of wireless networks, each of the plurality of wireless networks having ability to reconfigure its radio access technology and radio resources, the wireless network management method including steps of: collecting wireless network relevant information necessary for managing the wireless networks; discovering service requests of the wireless networks to generate a service request network set; determining, through network merge and/or network group split, a new wireless network configuration for the service request network set based on the wireless network relevant information; and issuing the determined wireless network configuration to the wireless networks so as to cause the wireless networks to perform system reconfiguration.

According to another aspect of the invention, there is further provided a computer program product for realizing the above described wireless network management method.

According to another aspect of the invention, there is further provided computer-readable medium on which computer program codes for realizing the above described wireless network management method are recorded.

BRIEF DESCRIPTION OF THE DRAWINGS

The invention can be better understood by referring to the detailed description given below with reference to the accompanying drawings throughout which identical or similar components are denoted by identical or similar reference numbers. The drawings together with the following detailed explanation are included in this specification and form part of the specification so as to further illustrate preferred embodiments of the invention by way of example and explain principles and advantages of the invention. In the drawing.

Figure 1:
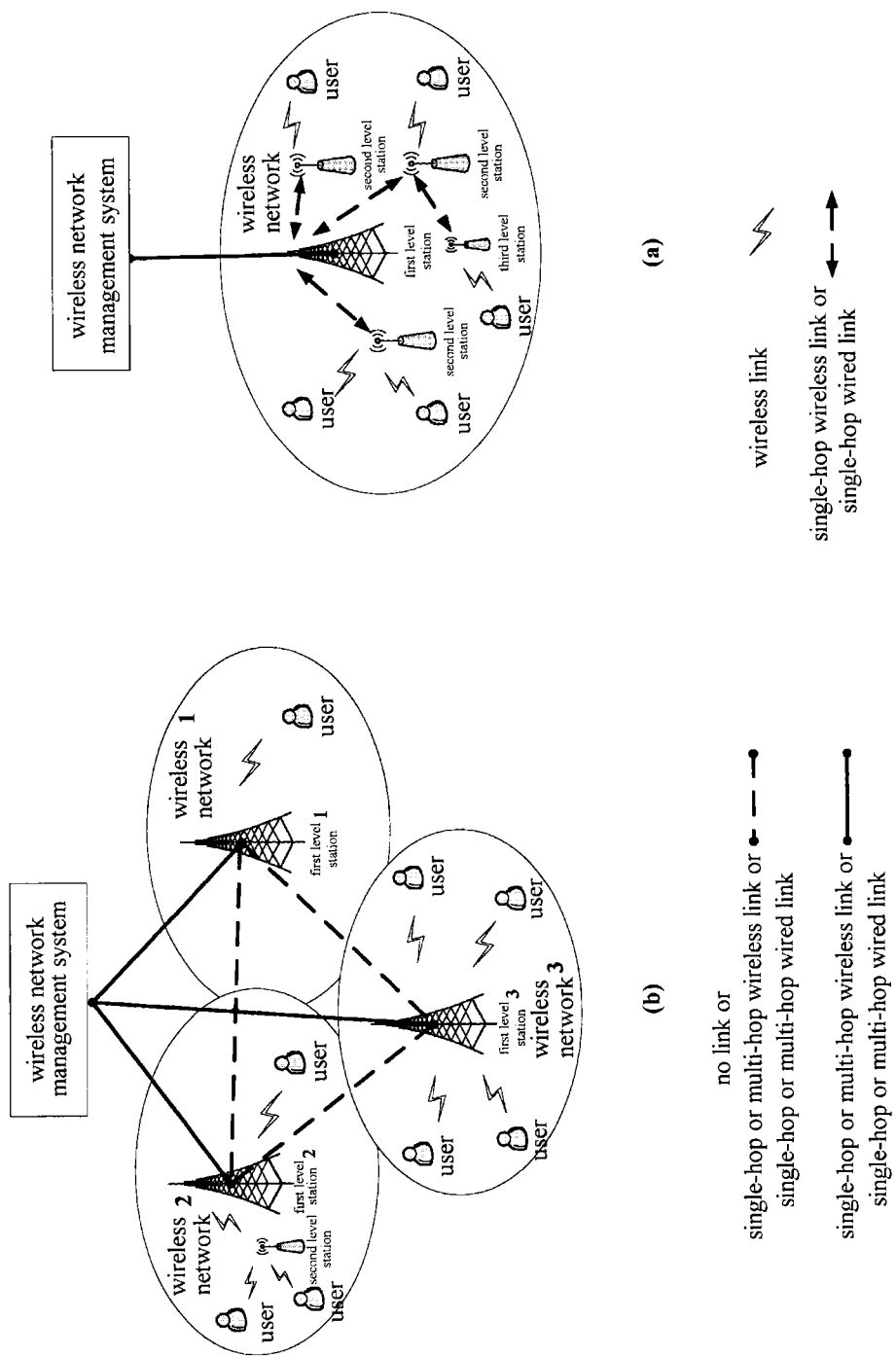
FIG. 1 shows an exemplary network architecture of management objects of a wireless network management system according to the invention.

Those skilled in the art should understand that elements in the drawings are merely shown for the purpose of simplicity and clarity but not necessarily drawn to scales. For example, some elements in the drawings may be enlarged relative to other elements so as to improve understanding for the embodiment of the invention.

DETAILED DESCRIPTION OF THE INVENTION

Exemplary embodiments of the present invention will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-relevant constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or processing steps closely relevant to the solutions of the invention are illustrated in the drawings while other details less relevant to the invention are omitted so as not to obscure the invention due to those unnecessary details.

Prior to describing the technical solution of the invention, the network architecture of the management objects of the wireless network management system according to the invention will be introduced first.

The management objects of the wireless network management system may be divided into two types (see FIG. 1):

Single network: the wireless network management system may be used to manage a single network having complex multi-hop structure (see FIG. 1(a)), such as a multi-hop wireless relay network with central control, a wireless mesh network or an Ad Hoc network, or the like. Infrastructures in these networks are referred to as stations, which may be divided into one level or multiple levels according to factors such as functions or the like. Stations are connected via wired or wireless links so as to provide wireless service for users within a network coverage range. The stations and the users have abilities to reconfigure the radio access technologies and radio resources. The wireless network management system resides within certain station(s) to manage the whole network.

Heterogeneous network: the wireless network management system may be used to manage a heterogeneous network (see FIG. 1(b)), the heterogeneous network being formed of a plurality of single networks, each of which being different from each other in terms of the radio access technologies, available radio resources, coverage ranges, network architectures, network performance or the like. For example, the single network may be of a simple point to multi-points single-hop structure (such as the wireless networks 1 and 3 in the drawing), and may also be of a complex multi-hop structure (such as the wireless network 2 in the drawing). Stations and users have abilities to reconfigure the radio access technologies and radio resources. Each single network is connected to the wireless network management system through wired or wireless links by one or more stations, thereby realizing management of the heterogeneous network by the wireless network management system.

When managing a complex single network, the wireless network management system divides the network into several sub-networks and then performs management with each sub-network being regarded as one single wireless network in the heterogeneous network. The dividing method may be to divide the network coverage range into a plurality of regions on average, in which stations in each region and users that the stations directly serve form a sub-network; and may also be to divide in accordance with relationship from a station to another, in which one or more stations interconnected via wired or wireless links and users that the stations directly serve constitute a sub-network. Herein, it is clear to those skilled in the art that the invention also applies to the complex single network divided into several sub-networks unless it is specifically illustrated that description will be made with the heterogeneous network as an example.

To make those skilled in the art clearly understand the technical solution of the invention, firstly a service model of the wireless network management system according to the invention is described exemplarily and new concepts and definitions thereof involved in the invention will be introduced.

Figure 2:
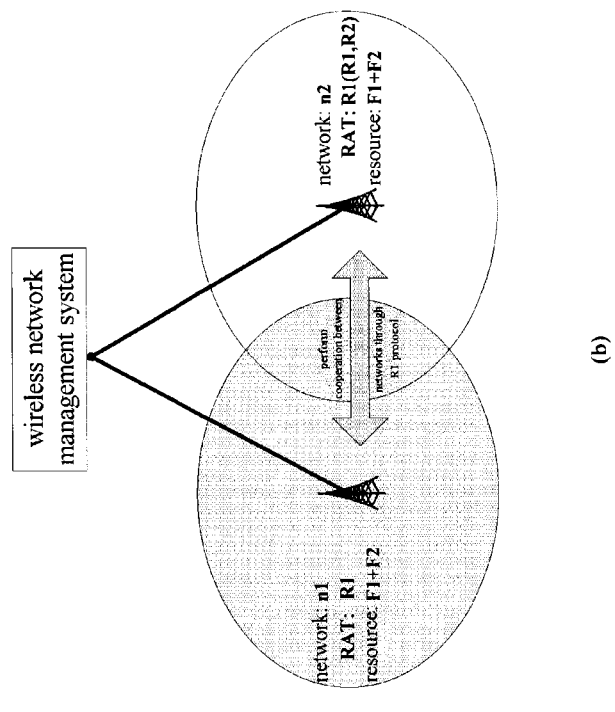
FIG. 2 shows a schematic diagram of a service model of the wireless network management system according to the invention.
Figure 2:
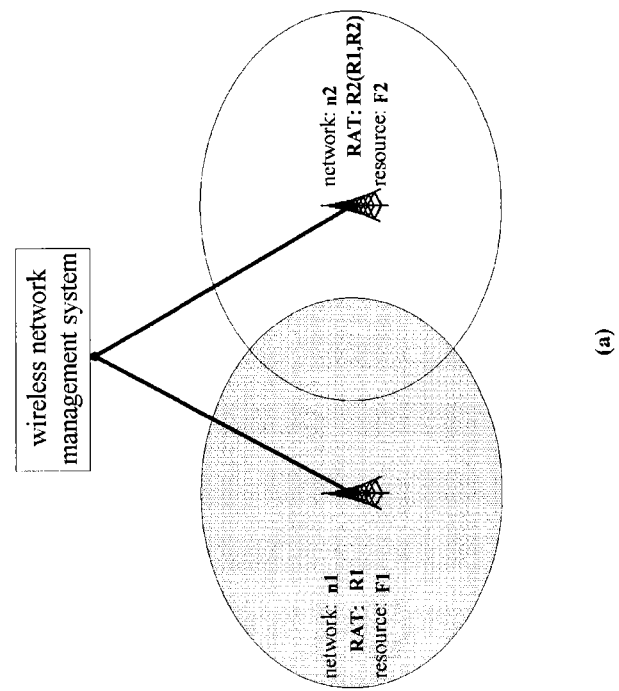

FIG. 2 schematically shows the service model of the wireless network management system according to the invention. Particularly, two neighboring wireless networks $n_1$ and $n_2$ are managed by the wireless network management system, available RAT for the network $n_1$ is R1, available RATs for the network $n_2$ are R1 and R2, and R1 may use resources F1 and F2, while R2 may only use the resource F2.

Service model 1: FIG. 2(a) shows a target problem, and FIG. 2(b) shows a solution. FIG. 2(a) illustrates a current network configuration in which the network $n_1$ uses R1 and the resource F1, and the network $n_2$ uses R2 and the resource F2. If a large amount of new services are abruptly added in the network $n_1$, then a total bandwidth request will exceed a capacity which can be provided by F1, and meanwhile, there still exists remaining bandwidth in the network $n_2$, then the networks $n_1$ and $n_2$ can be reconfigured to be in a state as shown in FIG. 2(b), in which the networks $n_1$ and $n_2$ simultaneously use R1, share the resources F1 and F2 through cooperation between networks via a R1 protocol. In this way, it is possible to provide more new businesses with services in the network $n_1$ while satisfying bandwidth request of the network $n_2$, so that limited radio resources can be utilized sufficiently.

Service model 2: FIG. 2(b) shows the target problem, and FIG. 2(a) shows the solution. Assume that the network is running in a state as shown in FIG. 2(b) currently. If load of the network $n_1$ resumes to be within a capacity range of the resource F1 and load of the network $n_2$ remains within a capacity range of F2, then the networks $n_1$ and $n_2$ can be reconfigured to be in a state as shown in FIG. 2(a). In this way, cooperation between networks is cancelled so as to save bandwidth resources necessary for cooperation and meanwhile to reduce delay caused by the cooperation.

The new concepts and definitions thereof involved in the invention are as follows:

Network Merge: a plurality of networks operating under different RATs are configured to use the same RAT and respective networks share resources through cooperation between networks. This operation is called network merge, as illustrated by service model 1.

Network Group: a plurality of networks are merged to form a network group. As shown in FIG. 2(*b*), the networks $n_1$ and $n_2$ form a network group.

Network Group Split: cooperation between one or more networks in the network group and original members in the network group is cancelled and RATs and resources are reconfigured. This operation is called network group split, as illustrated by service model 2.

Service Request Network: a network requesting the wireless network management system to provide network management service is called a service request network, such as a network in which resources can not satisfy user's bandwidth request and more resources need to be obtained through the network management service, for example, the network $n_1$ in the service model 1.

Service Request Network Set: a set consisted of all the service request networks, denoted by $N_{req}$. For example, the service request network set in the service model 1 is $\{n_1\}$, which includes only one element of the network $n_1$.

The wireless network management system according to the embodiment of the invention will be described in detail with reference to the drawings below.

Figure 3:
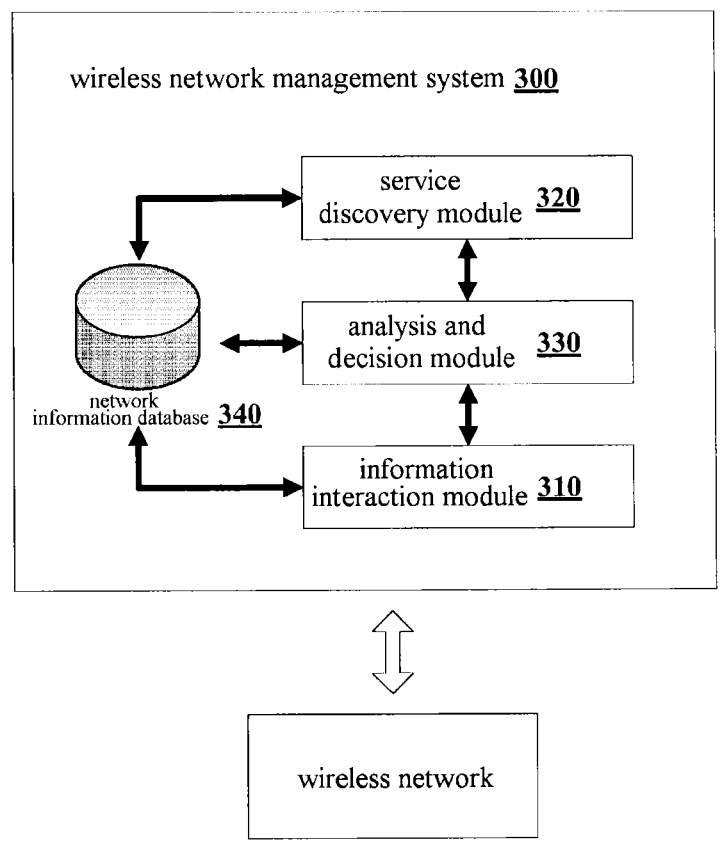
FIG. 3 shows a structural block diagram of the wireless network management system according to an embodiment of the invention.

FIG. 3 shows a structural block diagram of a wireless network management system 300 according to the embodiment of the invention. As shown in FIG. 3, the wireless network management system 300 is connected to a plurality of wireless networks in a wired or wireless manner to provide services. This wireless network management system 300 may include four main functional modules, that is, an information interaction module 310, a service discovery module 320, an analysis and decision module 330 and a network information database 340. Functions of each of the modules are described as follows:

The information interaction module 310: a main function is to collect wireless network relevant information necessary for managing the wireless networks and store in the network information database 340 for use by other modules in the wireless network management system 300; issue an analysis and decision result to the wireless networks; and preferably receive a reconfiguration result from the wireless networks and update the network information database 340.

The service discovery module 320: a main function is to discover service requests of the wireless networks to generate a service request network set.

The analysis and decision module 330: a main function is to determine, through network merge and/or network group split, a new wireless network configuration for the service request network set discovered by the service discovery module 320 based on the wireless network relevant information in the network information database 340.

The network information database 340: a main function is to store the wireless network relevant information.

The management service of the wireless network management system 300 is service request event-driven. The service request event can be classified into a plurality of situations in accordance with different initiators and initiating conditions and purposes. By way of example, below are listed five situations:

Event 1: the wireless network initiatively initiates service since the bandwidth can not satisfy the user's requests. Particularly, a large amount of new bandwidth requests are added in the wireless network, causing the total user bandwidth request to exceed a capacity range of the used resources, so that a New/Handoff Service Blocking Rate increases and the service is initiated;

Event 2: the wireless network expects that the bandwidth will not satisfy the user's request and initiatively initiates the service. Particularly, the wireless network expects that the new/handoff service blocking rate will increase in accordance with status of service arriving and used resources and then initiates the service;

Event 3: the wireless network management system 300 discovers that there exists a network the bandwidth of which can not satisfy the user's requests and then initiates the service. Particularly, the service discovery module 320 of the wireless network management system 300 discovers that the new/handoff service blocking rates of certain networks are high by analyzing the network information database 340 and then initiates the service;

Event 4: the wireless network management system 300 expects that bandwidth of certain networks will not satisfy the user's requests and initiates the service. Particularly, the service discovery module 320 of the wireless network management system 300 expects that the new/handoff service blocking rates of certain networks will increase according to network bandwidth usage status and throughput variation tendency by analyzing the network information database 340 and then initiates the service; and Event 5: the wireless network management system 300 initiates the service in order to optimize wireless network resource utilization rate. Particularly, the wireless network management system 300 sets a timing device in the service discovery module 320 to periodically initiate service aiming for network optimization, so as to optimize radio resource utilization rate.

There are a variety of classification methods for the service request event. From the view of initiators, the service request event can be classified as being initiated by the wireless network such as the request events 1 and 2 and being initiated by the wireless network management system such as the request events 3, 4 and 5. From the view of purpose, the service request event can be classified as having a purpose of solving a problem of the service request network bandwidth such as the request events 1, 2, 3 and 4 and having a purpose of optimizing the radio resource utilization efficiency in the wireless network such as the request event 5.

Figure 4:
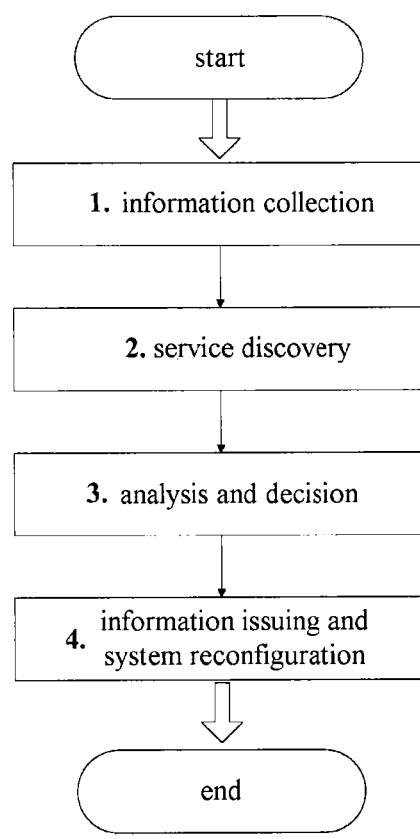
FIG. 4 shows a work flow diagram of management service of the wireless network management system according to the embodiment of the invention.

The work flow of the management service of the wireless network management system 300 is as shown in FIG. 4 and will be described briefly as follows:

Step 1: information collection. Particularly, in order to enable management of the wireless networks, the wireless network management system 300 needs to obtain necessary information and needs to periodically update this information if this information dynamically varies with the network operation procedure. The wireless network management system 300 mainly collects information from the wireless networks by the information interaction module 310.

Step 2: service discovery. Particularly, the service discovery module 320 determines objects of the network management service and generates the service request network set.

Step 3: analysis and decision. Particularly, the analysis and decision module 330 of the wireless network management system 300 determines a new wireless network configuration by analyzing service requests and information in the network information database 340.

Step 4: information issuing and system reconfiguration. Particularly, the information interaction module 310 of the wireless network management system 300 issues the analysis and decision result to the wireless networks so as to cause the wireless networks to perform system reconfiguration. Further, preferably, the wireless networks feed the configuration result back to the wireless network management system 300 through the information interaction module 310, and the wireless network management system 300 updates the network information database in accordance with the feedback information so as to maintain its contents to be consistent with network status.

Specific implementations of each of the above described steps will be described in detail below. However, it is to be understood by those skilled in the art that these specific implementations are only exemplary and this invention will not be limited thereto.

Step 1. Information Collection

Information necessary for service discovery and analysis and decision by the wireless network management system 300 mainly includes two types:

Intra-wireless network information: it includes RAT sets available for respective wireless networks and corresponding available radio resource sets, basic configuration of antennas (including position, height, beamforming, antenna gain, power control strategy, signal coverage range and so on), user's bandwidth request and so on.

Inter-wireless network information: it includes mutual interference degree and mutual communication ability when the same resources are used among respective wireless networks. The interference degree may be measured by a signal to noise ratio (SNR) among stations of the wireless networks, the larger a SNR value being, the smaller the mutual interference being, and vice versa. The communication ability can be categorized into two situations: in a case of wireless communication ability, it may also be measured by the SNR, the larger the SNR value being, the poorer the mutual communication ability being, and vice versa; and in a case of wired communication ability, it may be that the wireless networks are connected to each other via a wired backbone network or may exchange information via the wireless network management system.

Acquisition of this information may be implemented in three ways:

Direct information interaction: if this information is known to the wireless networks (such as the RAT sets and available radio resource sets, basic configuration of antennas (including position, height, beamforming, antenna gain and power control strategy) and user's bandwidth request), then this information can be reported to the wireless network management system 300 by the wireless networks through direct information interaction.

Calculation: if although this information is unknown, it can be obtained through calculation according to existing information, then it can be calculated and then reported to the wireless network management system 300 by the wireless networks; or it can be calculated directly by the wireless network management system 300. For example, a signal range may be calculated by the position, height, antenna gain and maximum power of the antennas. Also, for example, if the region in which the networks are distributed is flat, then mutual interference among respective wireless networks may be determined by calculating the SNR according to the position, height, antenna gain and maximum power of the antennas.

Measurement: if this information is unknown and can not be obtained through calculation according to the existing information, then it needs to be obtained through measurement. For example, if topography and physiognomy of the region in which the networks are distributed are complex, the mutual interference condition among respective wireless networks obtained only through calculation is not accurate enough and requires to be measured. A measurement method may be to allocate a dedicated timeslot for each antenna to be surveyed, and in this timeslot, the antenna to which the timeslot is allocated transmits a signal while other antennas listen and calculate the SNR to determine the interference condition with a target antenna, and then all the information are gathered to the wireless network management system 300 for analysis to obtain the interference condition between any two antennas among all the antennas.

Step 2. Service Discovery

Different service request network sets $N_{req}$ are generated according to different purposes of the service request events:

Type 1: the purpose is to solve the problem of the service request network bandwidth. If the management service is initiated by the wireless networks, then the service discovery module 320 of the wireless network management system 300 collects networks initiating the service requests within a period of time to be the service request network set $N_{req}$; and if the management service is initiated by the service discovery module 320 of the wireless network management system 300 by discovering wireless networks requesting to be served through analysis of the network information database 340, then these networks are collected to be the service request network set $N_{req}$; and Type 2: the purpose is to optimize the radio resource usage efficiency in the wireless networks. The corresponding service request network set $N_{req}$ contains all the wireless networks under jurisdiction of the whole wireless network management system 300.

Step 3. Analysis and Decision

Figure 5:
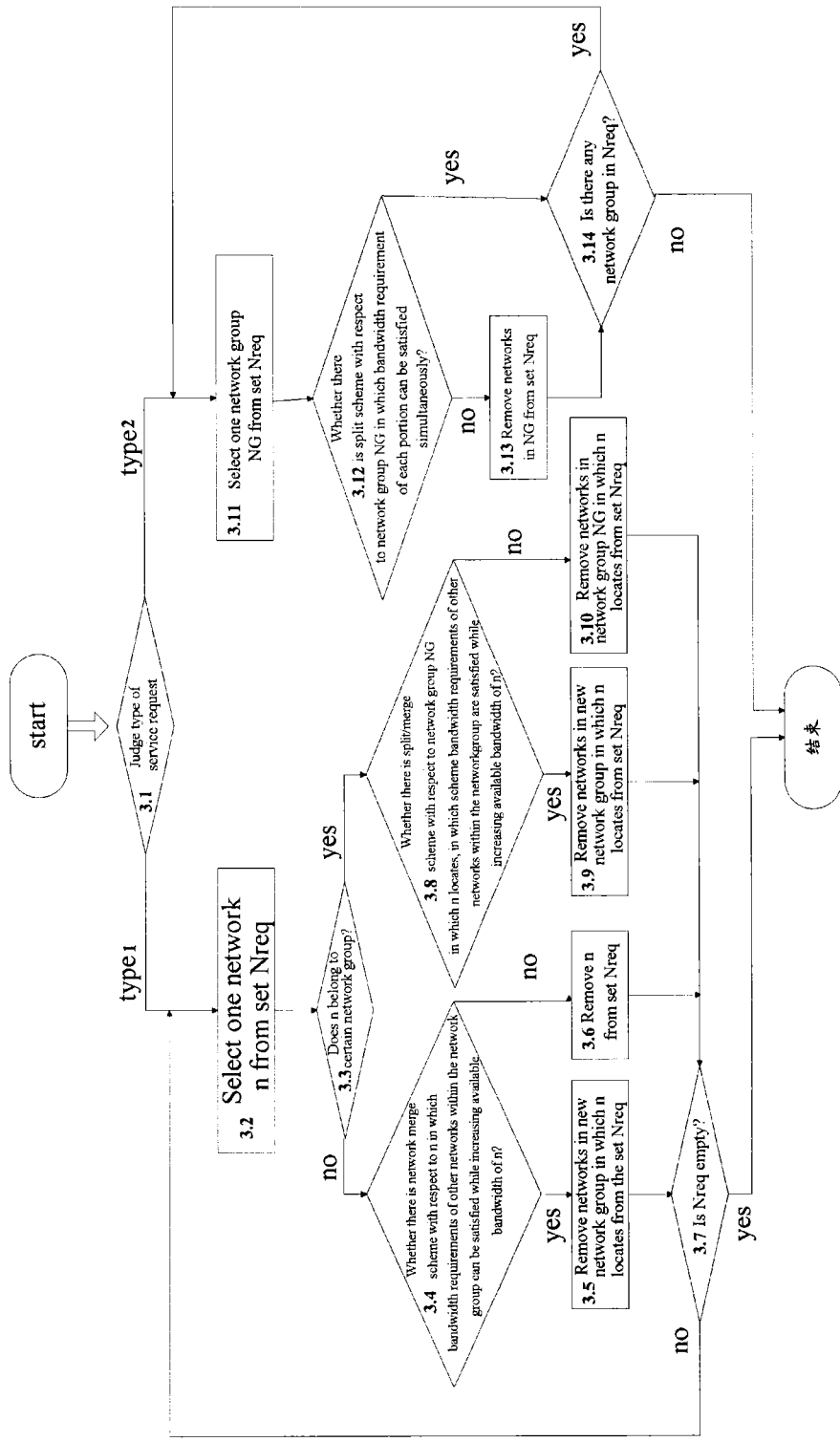
FIG. 5 shows a flow diagram of an analysis and decision process according to a specific embodiment of the invention.

The analysis and decision is a core of the management service, and specific implementation of this step will be described in detail with reference to FIG. 5 herein. As shown in FIG. 5, this step is detailed as follows:

Step 3.1 Type of the service request is judged.

Specifically, different analysis and decision procedures will be adopted for different types of service requests. Particularly, if the service request is type 1, the purpose of which is to increase available bandwidth of the service request network, then the processing turns to step 3.2; and if the service request is type 2, the purpose of which is to reduce scale and number of the network groups, then the processing turns to step 3.11.

Step 3.2 One network n is selected from the set $N_{Req}$.

Specifically, this selection method may be random selection or may also be selection according to extent to which the bandwidth request is not satisfied in an order from great to small, in which this extent is quantified as the new/handoff service blocking rate, the higher the blocking rate being, the greater the extent to which the bandwidth request is not satisfied being.

Step 3.3 It is judged whether n belongs to a certain network group at present.

Specifically, if n does not belong to any network group, then the processing turns to step 3.4, otherwise, the processing turns to step 3.8.

Step 3.4 It is judged whether there is a network merge scheme with respect to n, in which the available bandwidth of n can be increased while satisfying bandwidth requests of other networks in the network group.

Specifically, this judging process actually seeks to find available network merge schemes for n, and if found, then the processing turns to step 3.5, otherwise the processing turns to step 3.6.

Assume that all the networks under the jurisdiction of the wireless network management system 300 form a set N, a network group selected for n is NG, any member in NG is written as m, a bandwidth request of m before merge is written as $B_m$, and network capacity of n before merge is written as $C_n$, network capacity of NG after merge is written as $\tilde{C}_{NG}$, bandwidth consumed for cooperation among networks in NG after merge is written as $\tilde{B}_{NG}^{comm}$, and NG uses a radio access technology $RAT_{NG}$ and resource $F_{NG}$ after merge.

Then, the network group NG to be found has the following characteristics:

Condition 3.4.1: any two networks in NG may communicate with each other directly or indirectly via other networks in NG or the wireless network management system 300 to ensure transfer of cooperation information;

Condition 3.4.2: any network in NG may be configured to use the radio access technology $RAT_{NG}$ and the resource $F_{NG}$;

Condition 3.4.3: mutual interference between a network using $F_{NG}$ outside NG (belonging to N) and any network in NG is within a tolerable range;

Condition 3.4.4: if some networks in NG belong to other network groups before merge, then it is ensured that after removing these networks, those network groups may still have suitable configurations in which bandwidth requests of their member networks are satisfied and interference with other networks in N is ensured to be within the tolerable range; and Condition 3.4.5: NG ensures bandwidth requests of other networks other than n among its member networks while making the available bandwidth of n increase as compared with that before merge and the increased value be a maximum value among those of all selectable network groups, that is, ensuring that $$\tilde{C}_{NG} - \Sigma_{m \in NG, m \neq n} B_m - \tilde{B}_{NG}^{comm} > C_n \text{ and } NG =$$

$$\arg_{NG}\{\max\{\tilde{C}_{NG} - \Sigma_{m \in NG, m \neq n} B_m - \tilde{B}_{NG}^{comm}\}\}.$$

Scale of the network group (number of the wireless networks contained in the network group) and connectivity among respective networks (direct communication ability, that is, number of pairs of networks that enable direct communication between any two networks) have great influence on the resource utilization of the whole network group. The larger the scale is (the more the networks are), the poorer the connectivity is (the smaller the number of pairs of networks that enable direct communication between any two networks is), then the more the resources consumed in the network cooperation are, the lager a resulted delay is, and the poorer network stability is. Accordingly, there may be limitation on the largest scale of the network group, that is, setting an upper limit of the number of network members in the network group to be $|NG|_{max}$. An interference tolerance threshold is set as $SNR_1$ in order to quantize degree of interference among networks. If the SNR among stations of the wireless networks is larger than $SNR_1$, then the mutual interference is considered to be tolerable; and if the SNR among the stations of the wireless networks is smaller than or equals to $SNR_1$, then the mutual interference is considered to be intolerable. A communication allowable threshold is set as $SNR_C$ in order to quantize wireless communication ability among networks. If the SNR among the stations of the wireless networks is smaller than $SNR_C$, then it deems that the wireless communication can be performed directly; and if the SNR among the stations of the wireless networks is lager than or equals to $SNR_C$, then it deems that the wireless communication can not be performed directly.

A finding process will be given only when $|NG|_{max}=2$, and it can be easily extended to situations when $|NG|_{max}>2$.

In step 3.4.1, networks that can communicate with n in a wired manner or that can directly perform wireless communication with n (that is, networks satisfying $SNR<SNR_C$ with respect to n) are selected in the set N to form a set $N_1$ (ensuring the condition 3.4.1).

In step 3.4.2, networks that have common RATs and resources with n are selected in the set $N_1$ to form a set $N_2$ (ensuring the condition 3.4.2).

In step 3.4.3, for the common resources shared with n, networks whose interference with other networks using these resources is within the tolerable range are selected in the set $N_2$ to form a set $N_3$ (ensuring the condition 3.4.3).

In step 3.4.4, if there are networks in $N_3$ which are also from other network groups, then it is ensured that remaining networks other than these networks in those network groups have suitable configurations (RATs and resources) in which their bandwidth requests are satisfied while ensuring interference to other networks is within the tolerable range, and the networks satisfying these conditions form a set $N_4$ (ensuring the condition 3.4.4).

In step 3.4.5, networks that make the available bandwidth of n increase as compared with that before merge and make the increased value be the maximum value among those of all the selectable network groups in the set $N_4$ are selected (ensuring the condition 3.4.5), and the processing ends.

Step 3.5 Networks in a new network group in which n locates are removed from $N_{req}$, that is, $N_{req}=N_{req}-NG$.

Step 3.6 n is removed from $N_{req}$, that is, $N_{req}=N_{req}-\{n\}$.

Step 3.7 It is judged whether $N_{req}$ is empty.

Specifically, if $N_{req}$ is not empty, then the processing turns to step 3.2 and continues to perform operations on other networks; and if $N_{req}$ is empty, then it indicates that there is no wireless network that requests service and the processing ends.

Step 3.8 It is judged whether there is a split and/or merge scheme with respect to the network group in which n locates, in which scheme bandwidth requests of other networks in the network group can be satisfied while the available bandwidth of n can be increased.

Specifically, this judging process actually seeks to find a feasible split and/or merge scheme for the network group in which n locates, and if found, the processing turns to step 3.9, otherwise the processing turns to step 3.10.

Assume that the network group in which n locates is NG, and networks in the network group NG after split and/or merge operation are dispersed in k portions (each portion being one network or one network group) written as $NG_1$, $NG_2, \ldots, NG_k$ respectively. $NG_i$, $i \in [1 \ldots k]$ necessarily includes networks belonging to NG originally and may include networks not belonging to NG originally. Sum of bandwidth requests of respective networks in $NG_i$, i∈[1 . . . k] before the split and/or merge operation is written as $\Sigma_{m \in NG_i} B_m$, and capacity of $NG_i$, i∈[1 . . . k] after the split and/or merge operation is written as $\tilde{C}_{NG_i}$, bandwidth consumed for cooperation after split is written as $\tilde{B}_{NG_i}^{comm}$, a radio access technology used by $NG_i$ after the split and/or merge operation is written as $RAT_{NG_i}$, and the used resource is written as $F_{NG_i}$.

The feasible split and/or merge schemes for the network group NG needing to be found has the following characteristics:

Condition 3.8.1: in a case that $NG_i$ is a network group, any two networks in $NG_i$ may communicate with each other directly or indirectly via other networks in $NG_i$ or the wireless network management system 300 so as to ensure transfer of cooperation information;

Condition 3.8.2: in a case that $NG_i$ is a network group, any network in $NG_i$ may be configured to use a radio access technology $RAT_{NG_i}$ and resource $F_{NG_i}$;

Condition 3.8.3: mutual interference between networks which use $F_{NG_i}$ outside $NG_i$ (belonging to N) and any network in $NG_i$ is within the tolerable range;

Condition 3.8.4: if some networks in $NG_i$ belong to other network groups before the split and/or merge operation, then it is ensured that after removing these networks those network groups still have suitable configurations in which bandwidth requests of the member networks are satisfied and interference with other networks in N is ensured to be within the tolerable range; and Condition 3.8.5: capacity of $NG_i$ not including n satisfies bandwidth request of each network in $NG_i$; and capacity of $NG_i$ including n satisfies bandwidth requests of networks in $NG_i$, while making available bandwidth of n increase as compared with that before the split and/or merge operation and the increased value be the maximum value among those of all the selectable schemes, that is, $$\tilde{C}_{NG_i} - \tilde{B}_{NG_i}^{comm} - \Sigma_{m \in NG_i} B_m \begin{cases} \geq 0, \text{ if } n \notin NG_i \\ > 0, \text{ if } n \in NG_i \end{cases}, i \in [1..k],$$

$$\text{and } NG_i = \underset{NG_i, n \in NG_i}{\arg} \{\max\{\tilde{C}_{NG_i} - \Sigma_{m \in NG_i, m \neq n} B_m - \tilde{B}_{NG_i}^{comm}\}\}$$

An exemplary process for finding the split and/or merge scheme is as follows:

In step 3.8.1, n is separated from NG, and the remaining networks in NG produce several connected network groups (where any two networks may communicate with each other directly or indirectly via other networks in the network group).

In step 3.8.2, RATs and resources are allocated to each connected network group so as to satisfy requirements of the conditions 3.8.2 to 3.8.5. If the scheme is found, the processing turns to step 3.8.3, otherwise the processing ends.

In step 3.8.3, RAT and resources are allocated to n so as to satisfy the requirement of the condition 3.8.5. If the scheme is found, the processing ends, otherwise, a merge scheme is found for n according to the method in step 3.4 and the processing ends.

Step 3.9 Networks in a new network group in which n locates are removed from $N_{req}$.

Step 3.10 Networks in the network group NG in which n locates are removed from $N_{req}$, that is, $N_{req}=N_{req}-NG$.

Step 3.11 One network group NG is selected from the set $N_{req}$.

Specifically, this selection method may be random selection or may also be selection according to the scale of the network group in an order from large to small.

Step 3.12 It is judged whether there is a split scheme with respect to the network group NG in which bandwidth request of each network within the network group can be satisfied simultaneously.

Specifically, this judging process actually seeks to find a feasible network group split scheme for NG, and if found, the processing turns to step 3.14, otherwise, the processing turns to step 3.13.

Assume that NG is split into k portions written as $NG_1, NG_2, \ldots, NG_k$ respectively. Sum of bandwidth requests of respective networks in $NG_i$, i∈[1 . . . k] is written $\Sigma_{m \in NG_i} B_m$, capacity of $NG_i$, i∈[1 . . . k] after split is written as $\tilde{C}_{NG_i}$, bandwidth consumed for cooperation after split is written as $\tilde{B}_{NG_i}^{comm}$, the scale of $NG_i$ i.e. number of member networks is written as $|NG_i|$, and the radio technology used by $NG_i$ after split is written as $RAT_{NG_i}$ and the used resource is written as $F_{NG_i}$.

The split scheme for NG needing to be found has the following characteristics:

Condition 3.12.1: in a case that $NG_i$ is a network group, any two networks in $NG_i$, i∈[1 . . . k] may communicate with each other directly or indirectly via other networks in $NG_i$ or the wireless network management system 300 so as to ensure transfer of the cooperation information;

Condition 3.12.2: in a case that $NG_i$ is a network group, any network in $NG_i$, i∈[1 . . . k] may be configured to use the radio access technology $RAT_{NG_i}$ and the resource $F_{NG_i}$;

Condition 3.12.3: mutual interference between networks which use $F_{NG_i}$ outside $NG_i$, i∈[1 . . . k] (belonging to N) and any network in $NG_i$ is within the tolerable range;

Condition 3.12.4: capacity of each of the portions into which NG is split satisfies the bandwidth request, that is, $\tilde{C}_{NG_i} - \tilde{B}_{NG_i}^{comm} \geq \Sigma_{m \in NG_i} B_m$, i∈[1 . . . k]; and Condition 3.12.5: scale of each of the portions into which NG is split is smaller than the scale of NG, that is, $|NG| > |NG_i|$, i∈[1 . . . k].

An exemplary process for finding the split scheme is as follows:

In step 3.12.1, a value of a variable i is assigned to 1.

In step 3.12.2, NG is split into two portions, one portion including i networks, while the other portion including $|NG|-i$ networks, and it is ensured that each portion satisfies the requirements of the conditions 3.12.1 to 3.12.5. If the scheme is found, then the processing stops, otherwise, the processing turns to step 3.12.3.

In step 3.12.3, the value of the variable i is assigned to be i+1 and the value of i is judged, if $i < \lfloor |NG|/2 \rfloor$, the processing turns to step 3.12.2, otherwise the processing stops. $\lfloor * \rfloor$ represents a floor operation.

Step 3.13 NG is removed from $N_{req}$, that is, $N_{req}=N_{req}-NG$.

Step 3.14 It is judged whether there still remain network groups in $N_{req}$, if so, the processing turns to step 3.11, otherwise the processing ends.

It is to be noted that although the case in which both type 1 and type 2 are handled is described in the above process, those skilled in the art would understand that the invention is not limited thereto, but may also be applied to a case in which only type 1 or type 2 is handled, and at this time, step 3.1 may be omitted. Further, in a simplified implementation, in the case of type 1, the service request network set may only include networks which are not included in any network groups and perform processing only on these networks without processing service request networks which have been already included in a certain network group.

Step 4. Information Issuing and System Reconfiguration

The wireless network management system 300 issues the analysis and decision result to the wireless networks via the information interaction module 310, and such information mainly includes:

Intra-wireless network information: a set of radio access technologies RATs and available radio resources of configuration requested by each of the wireless networks; and Inter-wireless network information: constituent members of a network group in which each wireless network locates.

Upon receipt of information about the analysis and decision result, the wireless networks perform reconfiguration in accordance with this information and feeds the reconfiguration result back to the wireless network management system 300 via the information interaction module 310. The information interaction module 310 updates the network information database 340 to maintain its contents to be consistent with the network status.

Basic principles of the invention have been described in combination with specific embodiments above, but it shall be noted that those skilled in the art can understand that all or any of steps or components of the method and device of the invention may be implemented by hardware, firmware, software or combinations thereof in any computing device (including a processor, a storage medium or the like) or a network of computing devices, which can be achieved by those skilled in the art by utilizing their basic programming skills after reading the description of the invention.

Therefore, the object of the invention may also be achieved by running a program or a set of programs on any computing devices. The computing devices may be well-known general-purpose devices. Therefore, the object of the invention may also be achieved simply by providing a program product containing program codes implementing the method or device. That is, such program product also constitutes the invention, and a storage medium storing such program product also constitutes the invention. Obviously, the storage medium may be any well-known storage medium or any storage medium to be developed in the future.

Figure 6:
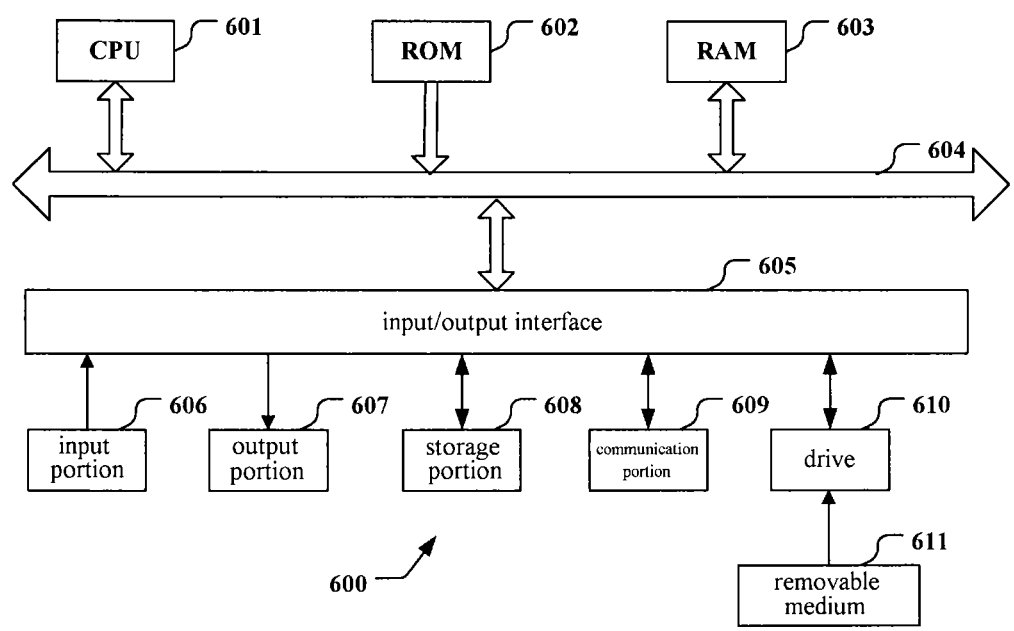
FIG. 6 shows an exemplary structural block diagram of a computer in which the invention is implemented.

In a case that the embodiments of the invention are implemented by software and/or firmware, programs constituting the software are installed from a storage medium or a network into a computer with a dedicated hardware structure, for example, a general-purpose computer 600 illustrated in FIG. 6, which can carry out various functions and the like when installed with various programs.

In FIG. 6, a central processing unit (CPU) 601 executes various processes in accordance with a program stored in a read only memory (ROM) 602 or a program loaded from a storage portion 608 to a random access memory (RAM) 603. Data required for the CPU 601 to execute various processes and the like is also stored in the RAM 603 as required. The CPU 601, the ROM 602 and the RAM 603 are connected to one another via a bus 604. An input/output interface 605 is also connected to the bus 604.

The following components are connected to the input/output interface 605: an input portion 606 including a keyboard, a mouse, and the like; an output portion 607 including a display such as a cathode ray tube (CRT), a liquid crystal display (LCD), and the like, a speaker and the like; the storage portion 608 including a hard disk or the like; and a communication portion 609 including a network interface card such as a LAN card, a modem, and the like. The communication portion 609 performs communication via the network such as Internet.

A drive 610 is also connected to the input/output interface 605 as required. A removable medium 611, such as a magnetic disk, an optical disk, a magneto optical disk, a semiconductor memory, or the like, is mounted on the drive 610 as required, so that a computer program read therefrom is installed into the storage portion 608 as required.

In a case that the above-described series of processes are implemented by the software, the program that constitutes the software is installed from the network such as the Internet or the storage medium such as the removable medium 611.

Those skilled in the art should understand that this storage medium is not limited to the removable medium 611 in which a program is stored and which is distributed separately from the device so as to provide the program to the user as shown in FIG. 6. Examples of the removable medium 611 include the magnetic disk (including floppy disk (registered trade mark)), the optical disk (including compact disk-read only memory (CD-ROM) and digital versatile disk (DVD)), the magneto optical disk (including mini disk (MD) (registered trade mark)) and the semiconductor memory. Alternatively, the storage medium may be the ROM 602, the hard disk contained in the storage portion 608 or the like, in which a program is stored and which is distributed to the user together with the device containing it.

It shall also be noted that obviously each component or each step may be decomposed and/or recombined in the device and method of the present invention. These decompositions and/or re-combinations shall be considered as equivalent schemes of the present invention. Also, the steps of performing the above series of processes may be naturally performed chronologically in an order of description but not necessarily. Some steps may be performed in parallel or independently from one another.

Although the invention and advantages thereof have been described in detail herein, it shall be understood that various changes, replacements and modifications may be made without departing from the spirit and scope of the invention defined by the appended claims. Furthermore, the terms "comprise", "include" or any other variation thereof are intended to cover a non-exclusive inclusion, so that a process, method, article, or device that comprises a list of elements includes not only those elements but also other elements not explicitly listed or inherent to such process, method, article, or device. Unless further defined, a sentence "comprises a/an . . . " which defines an element does not preclude the existence of additional identical element(s) in the process, method, article, or device that comprises the element.

The invention claimed is:

1. A wireless network management system for managing radio access technologies and available resources of a plurality of wireless networks, each of the plurality of wireless networks having ability to reconfigure its radio access technology and radio resources, the wireless network management system comprising:

an information interaction module configured to collect wireless network relevant information necessary for managing the wireless networks;

a service discovery module configured to discover service requests of the wireless networks to generate a service request network set; and an analysis and decision module configured to determine, through network merge and/or network group split, a new wireless network configuration for the service request network set discovered by the service discovery module based on the wireless network relevant information;

wherein the information interaction module is further configured to issue the wireless network configuration determined by the analysis and decision module to the wireless networks so as to cause the wireless networks to perform system reconfiguration.

2. The wireless network management system according to claim 1, wherein each of the plurality of wireless networks is a sub-network in a single network or a single network constituting a heterogeneous network.

3. The wireless network management system according to claim 1, wherein the information interaction module is further configured to receive a reconfiguration result of the wireless networks so as to update a network information database storing the wireless network relevant information.

4. The wireless network management system according to claim 1, wherein in a case where the type of the service request is a first type with the purpose of solving a bandwidth problem of a service request network, the analysis and decision module finds, with respect to a service request network n which does not belong to any network group in the service request network set, a network merge scheme regarding the service request network n to generate a network group NG containing the service request network n, such that bandwidth requests of other networks within the network group NG are satisfied while increasing the bandwidth of the service request network n.

5. The wireless network management system according to claim 4, wherein the network group NG satisfies the following conditions:
   any two networks in the network group NG are capable of communicating with each other directly or indirectly;
   any network in the network group NG can be configured to use the same radio access technology $RAT_{NG}$ and resource $F_{NG}$;
   mutual interference between a network using the resource $F_{NG}$ outside the network group NG and any network in the network group NG is within a tolerable range;
   if there is a network in the network group NG, which belongs to other network group before the merge operation, it is ensured that after removing that network the other network group still has a suitable configuration in which the bandwidth requests of its member networks are satisfied and the interference with other networks in a network set N composed of all the wireless networks is ensured to be within a tolerable range; and
   the network group NG ensures bandwidth request of any network other than the service request network n among the member networks thereof, while making available bandwidth of the service request network n increase as compared with that before the merge operation and the increased value be a maximum value among those of all selectable network groups.

6. The wireless network management system according to claim 1, wherein in a case where the type of the service request is a first type with the purpose of solving a bandwidth problem of a service request network, the analysis and decision module finds, with respect to a service request network n which has belonged to a network group NG in the service request network set, a network group split and/or network merge scheme regarding the service request network n, such that bandwidth requests of other networks within the network group NG are satisfied while increasing the bandwidth of the service request network n.

7. The wireless network management system according to claim 6, wherein the networks in the network group NG are dispersed in one or more portions after the split and/or merge operation, wherein each portion $NG_i$ is a network or a network group and satisfies the following conditions:
   in a case where the portion $NG_i$ is a network group, any two networks in the portion $NG_i$ are capable of communicating with each other directly or indirectly;
   in a case where the portion $NG_i$ is a network group, any network in the portion $NG_i$ can be configured to use the same radio access technology $RAT_{NG_i}$ and resource $F_{NG_i}$;
   mutual interference between a network using the resource $F_{NG_i}$ outside the portion $NG_i$ and any network in the portion $NG_i$ is within a tolerable range;
   in a case where the portion $NG_i$ is a network group, if there is a network in the portion $NG_i$, which belongs to other network group before the merge and/or split operation, it is ensured that after removing that network the other network group still has a suitable configuration in which the bandwidth requests of its member networks are satisfied and interference with other networks in a network set N composed of all the wireless networks is ensured to be within a tolerable range; and
   a capacity of the portion $NG_i$ not including the service request network n satisfies the bandwidth requests of respective networks therein; while the portion $NG_i$ including the service request network n satisfies the bandwidth requests of respective networks therein, while making available bandwidth of the service request network n increase as compared with that before the split and/or merge operation and the increased value be a maximum value among those of all selectable schemes.

8. The wireless network management system according to claim 1, wherein in a case where the type of the service request is a second type with the purpose of optimizing radio resource usage efficiency in the wireless networks, the analysis and decision module finds, with respect to each network group NG in the service request network set, a split scheme regarding the network group NG such that bandwidth requests of respective networks within the network group NG are satisfied.

9. The wireless network management system according to claim 8, wherein the network group NG is split into a plurality of portions, wherein each portion $NG_i$ is a network or a network group and satisfies the following conditions:
   in a case where the portion $NG_i$ is a network group, any two networks in the portion $NG_i$ are capable of communicating with each other directly or indirectly;
   in a case where the portion $NG_i$ is a network group, any network in the portion $NG_i$ can be configured to use the same radio access technology $RAT_{NG_i}$ and resource $F_{NG_i}$;
   mutual interference between a network use the resource $F_{NG_i}$ outside the portion $NG_i$ and any network in the portion $NG_i$ is within a tolerable range;
   a capacity of the portion $NG_i$ satisfies the bandwidth requests therein; and
   a scale of the portion $NG_i$ is smaller than that of the network group NG.

10. A wireless network management method for managing radio access technologies and radio resources of a plurality of wireless networks, each of the plurality of wireless networks having ability to reconfigure its radio access technology and radio resources, the wireless network management method comprising the steps of:
   collecting wireless network relevant information necessary for managing the wireless networks;
   discovering service requests of the wireless networks to generate a service request network set;

determining, through network merge and/or network group split, a new wireless network configuration for the service request network set based on the wireless network relevant; and issuing the determined wireless network configuration to the wireless networks so as to cause the wireless networks to perform system reconfiguration.

11. The wireless network management method according to claim 10, wherein each of the plurality of wireless networks is a sub-network in a single network or a single network constituting a heterogeneous network.

12. The wireless network management method according to claim 10, further comprising receiving a reconfiguration result of the wireless networks so as to update a network information database storing the wireless network relevant information.

13. The wireless network management method according to claim 10, wherein in a case where the type of the service request is a first type with the purpose of solving a bandwidth problem of a service request network, in the processing of determining the new wireless network configuration, with respect to a service request network n which does not belong to any network group in the service request network set, a network merge scheme regarding the service request network n is found to generate a network group NG containing the service request network n, such that bandwidth requests of other networks within the network group NG are satisfied while increasing the bandwidth of the service request network n.

14. The wireless network management method according to claim 13, wherein the network group NG satisfies the following conditions:

any two networks in the network group NG are capable of communicating with each other directly or indirectly;

any network in the network group NG can be configured to use the same radio access technology $RAT_{NG}$ and resource $F_{NG}$;

mutual interference between a network using the resource $F_{NG}$ outside the network group NG and any network in the network group NG is within a tolerable range;

if there is a network in the network group NG, which belongs to other network group before the merge operation, it is ensured that after removing that network the other network group still has a suitable configuration in which the bandwidth requests of its member networks are satisfied and the interference with other networks in a network set N composed of all the wireless networks is ensured to be within a tolerable range; and the network group NG ensures bandwidth request of any network other than the service request network n among the member networks thereof, while making available bandwidth of the service request network n increase as compared with that before the merge operation and the increased value be a maximum value among those of all selectable network groups.

15. The wireless network management method according to claim 10, wherein in a case where the type of the service request is a first type with the purpose of solving a bandwidth problem of a service request network, in the processing of determining the new wireless network configuration, with respect to a service request network n which has belonged to a network group NG in the service request network set, a network group split and/or network merge scheme regarding the service request network n is found, such that bandwidth requests of other networks within the network group NG are satisfied while increasing the bandwidth of the service request network n.

16. The wireless network management method according to claim 15, wherein the networks in the network group NG are dispersed in one or more portions after the split and/or merge operation, wherein each portion $NG_i$ is a network or a network group and satisfies the following conditions:

in a case where the portion $NG_i$ is a network group, any two networks in the portion $NG_i$ are capable of communicating with each other directly or indirectly;

in a case where the portion $NG_i$ is a network group, any network in the portion $NG_i$ can be configured to use the same radio access technology $RAT_{NG_i}$ and resource $F_{NS_i}$;

mutual interference between a network using the resource $F_{NG_i}$ outside the portion $NG_i$ and any network in the portion $NG_i$ is within a tolerable range;

in a case where the portion $NG_i$ is a network group, if there is a network in the portion $NG_i$, which belongs to other network group before the merge and/or split operation, it is ensured that after removing that network the other network group still has a suitable configuration in which the bandwidth requests of its member networks are satisfied and interference with other networks in a network set N composed of all the wireless networks is ensured to be within a tolerable range; and a capacity of the portion $NG_i$ not including the service request network n satisfies the bandwidth requests of respective networks therein; while the portion $NG_i$ including the service request network n satisfies the bandwidth requests of respective networks therein, while making available bandwidth of the service request network n increase as compared with that before the split and/or merge operation and the increased value be a maximum value among those of all selectable schemes.

17. The wireless network management method according to claim 10, wherein in a case where the type of the service request is a second type with the purpose of optimizing radio resource usage efficiency in the wireless networks, in the processing of determining the new wireless network configuration, with respect to each network group NG in the service request network set, a split scheme regarding the network group NG is found such that bandwidth requests of respective networks within the network group NG are satisfied.

18. The wireless network management method according to claim 17, wherein the network group NG is split into a plurality of portions, wherein each portion $NG_i$ is a network or a network group and satisfies the following conditions:

in a case where the portion $NG_i$ is a network group, any two networks in the portion $NG_i$ are capable of communicating with each other directly or indirectly;

in a case where the portion $NG_i$ is a network group, any network in the portion $NG_i$ can be configured to use the same radio access technology $RAT_{NG_i}$ and resource $F_{NG_i}$;

mutual interference between a network use the resource $F_{NG_i}$ outside the portion $NG_i$ and any network in the portion $NG_i$ is within a tolerable range;

a capacity of the portion $NG_i$ satisfies the bandwidth requests therein; and a scale of the portion $NG_i$ is smaller than that of the network group NG.

19. A non-transitory storage medium comprising a program product on which machine-readable instruction codes are stored, the machine-readable instruction codes performing a wireless network management method when being read and executed by the machine, the wireless network management method being used for managing radio access technologies and radio resources of a plurality of wireless networks, each of the plurality of wireless networks having ability to reconfigure its radio access technology and radio resources, the wireless network management method comprising the steps of:

- collecting wireless network relevant information necessary for managing the wireless networks;
- discovering service requests of the wireless networks to generate a service request network set;
- determining, through network merge and/or network group split, a new wireless network configuration for the service request network set based on the wireless network relevant information; and
- issuing the determined wireless network configuration to the wireless networks so as to cause the wireless networks to perform system reconfiguration.

* * * * *